United States Patent [19]
O'Mahony

[11] Patent Number: 5,818,913
[45] Date of Patent: Oct. 6, 1998

[54] METHOD AND APPARATUS FOR MULTIPLEXING VOICE DATA OVER A SINGLE DTE/DCE LINK

[75] Inventor: Barry O'Mahony, Banks, Oreg.

[73] Assignee: Intel Corporation, Santa Clara, Calif.

[21] Appl. No.: 698,778

[22] Filed: Aug. 16, 1996

Related U.S. Application Data

[63] Continuation of Ser. No. 316,548, Sep. 30, 1994, abandoned.

[51] Int. Cl.⁶ .................................................. H04M 11/00
[52] U.S. Cl. ..................................... 379/93.08; 379/93.31
[58] Field of Search ............................ 379/93.08, 93.09, 379/93.01, 93.28, 93.31, 93.17; 375/222

[56] References Cited

U.S. PATENT DOCUMENTS

| | | |
|---|---|---|
| 2,974,281 | 3/1961 | Feldman . |
| 4,435,804 | 3/1984 | Tan . |
| 4,442,540 | 4/1984 | Allen . |
| 4,512,013 | 4/1985 | Nash . |
| 4,644,527 | 2/1987 | Anderson et al. . |
| 4,715,059 | 12/1987 | Hart et al. . |
| 4,757,495 | 7/1988 | Decker et al. . |
| 4,805,208 | 2/1989 | Schwartz . |
| 4,813,040 | 3/1989 | Futato ........................................ 379/93 |
| 4,932,047 | 6/1990 | Emmons et al. . |
| 4,991,197 | 2/1991 | Morris ........................................ 379/58 |
| 5,086,453 | 2/1992 | Senoo et al. . |
| 5,091,877 | 2/1992 | Itoh et al. . |
| 5,182,762 | 1/1993 | Shirai et al. . |
| 5,200,962 | 4/1993 | Valentaten et al . |
| 5,283,638 | 2/1994 | Engberg et al. ........................... 379/93 |
| 5,325,423 | 6/1994 | Lewis . |
| 5,359,644 | 10/1994 | Tanaka et al. . |
| 5,365,576 | 11/1994 | Tsummura et al. ....................... 379/93 |
| 5,374,952 | 12/1994 | Flohr ......................................... 348/12 |
| 5,428,608 | 6/1995 | Freeman et al. .......................... 379/93 |
| 5,440,585 | 8/1995 | Partridge, III ........................... 375/222 |
| 5,452,289 | 9/1995 | Sharma et al. .......................... 370/32.1 |
| 5,463,616 | 10/1995 | Kruse et al. . |
| 5,502,727 | 3/1996 | Catanzaro et al. ........................ 379/93 |
| 5,692,035 | 11/1997 | O'Mahony et al. ....................... 379/93 |

FOREIGN PATENT DOCUMENTS

| | | |
|---|---|---|
| 0501485 | 2/1992 | European Pat. Off. . |
| 2187611 | 2/1987 | United Kingdom . |

OTHER PUBLICATIONS

Technische Rundschau, vol. 84, No. 4, 24 Jan. 1992, Bern Ch pp. 36–38, XP247737 Braun "Auf der Schiene: zum Computer Integrated Railroading".

Mitel Corporation Data Sheet for "Data Over Voice Modem", Part#MT8840, issue 3, Dec. 1987.

Schwartz, Jeffrey, "User Deployes Data–Voice System", article appearing in Communication week, Sep. 28, 1992.

Stockford, Paul, "Voice View Offers Voice and Data Over a Single Analog Line", article appering in Voice Processing Magazine, Jul. 1992.

*Primary Examiner*—Stella Woo
*Attorney, Agent, or Firm*—Blakely, Sokoloff, Taylor & Zafman

[57] ABSTRACT

An otherwise conventional DTE and an otherwise conventional DCE are provided with operating logic for multiplexing voice and data on a single DTE–DCE link linking the DTE and the DCE. The operating logic of the DTE/DCE transmits voice over the link for the DCE/DTE at nominally fixed intervals without flow control and buffering, and non-voice data in the remaining time with flow control and buffering. Voice are distinguished from data by transmitting predetermined special characters, or changing handshake circuit state, or using secondary circuit for transmission.

15 Claims, 4 Drawing Sheets

METHOD AND APPARATUS FOR MULTIPLEXING VOICE DATA OVER A SINGLE DTE/DCE LINK

This is a continuation of application Ser. No. 08/316,548, filed Sep. 30, 1994, now abandoned.

BACKGROUND OF THE INVENTION

1. Field of the Invention

The present invention relates to the field of Data Communication. More specifically, the present invention relates to voice and data transmission over a single data terminal equipment (DTE) and data circuit terminating equipment (DCE) connection.

2. Background Information

Today, many DCEs, including but not limited to the one disclosed in U.S. Pat. application Ser. No. 08/265,455, filed on Jun. 24, 1994, entitled Method and Apparatus For Making A Multi-Modal Voice And/Or Data Call Over A Single Analog-Loop Telephone Line, assigned to the assignee of the present invention, support simultaneous voice and data communication on behalf of a locally connected DTE and telephone with a remote communication endpoint. At the same time, many DTEs are now equipped with integrated telephonic circuitry, headset and microphone interfaces, providing the possibility of eliminating the external telephone. Furthermore, many of these DTEs are equipped with processors having sufficient instruction execution capacity to off-load the voice and possibly also the data compression and decompression tasks from the digital signal processors (DSPs) of the DCEs, allowing the DCEs to support higher transmission rates or the same transmission rates with lower cost DSPs.

However, to exploit the integrated telephonic and audio capability as well as the processing power of these DTEs, compressed voice and data would have to be transmitted between the DTEs and the DCEs. In a connection between a conventional DTE (such as a personal computer), and a conventional DCE (such as a modem), the DTE–DCE link is a single, asynchronous (i.e. character-oriented, start-stop framed) connection, which includes some subset of the logical data channels and control circuits defined in Telecommunication Union-Technical Standardization Sector's (ITU-T) Recommendation V.24 (typically, one data channel in each direction, and a total of six control channels). The conventional DCE cannot distinguish between data and compressed voice on the DTE–DCE link; thus all information received from the DTE by the DCE is placed in a single buffer in the DCE, where flow control is used to prevent buffer overflow. The DCE removes information from this buffer at a rate determined by the connection speed between itself and another DCE over the telephone connection (i.e. the line rate, measured in bits per second). Typically, information is transferred from one DCE to the other DCE using V.42 error control procedures, using a single logical channel (i.e. a single DLCI).

Thus, this configuration of a conventional DTE and DCE does not interwork well with the simultaneous voice and data DCE described in the above identified U.S. Pat. application, Ser. No. 08/265,455. Additionally, the compressed voice is delayed in the transmitting DCE by being inserted in the same buffer as the non-voice data. While this buffering delay has no impact on the non-voice data, the additional latency of the digitized, compressed voice can be very annoying to users attempting a two-way conversation, and poor usability can result.

A typical solution is provide an alternative dedicated voice path for transmitting voice between the DTE and the DCE, leaving only commands and data to be transmitted over the conventional DTE–DCE connection. The approach has the obvious disadvantage of being more expensive because of the hardware associated with the additional path. Thus, it is desirable to be able to multiplex voice and data over a single DTE–DCE connection, such that the DCE can distinguish non-voice data from digitized voice. This will enable the DCE interwork with a SVD DCE by sending the voice information in a separate V.42 DLCI, and to not needlessly delay such voice information by storing in the same buffer as the non-voice data.

As will be disclosed in more detail below, the present invention provides for a method and apparatus for multiplexing voice and data over a single DTE–DCE connection that achieves these and other desirable results.

SUMMARY OF THE INVENTION

The present invention advantageously achieves the desired results by providing an otherwise conventional DTE and an otherwise conventional DCE with identical control logic for multiplexing voice and data over a single connection. In either case, the control logic causes voice to be transmitted over the connection in nominally fixed intervals without flow control and buffering, to ensure minimum latency. Non-voice data is transmitted over the link during the remaining times with flow control and buffering.

In one embodiment, voice is distinguished from data by using predetermined special characters, e.g. escape characters. In an alternate embodiment, which implements ITU-T's V.24 interface, voice are transmitted using the secondary circuit (also known as the backward channel), and data are transmitted using the primary circuit. In yet a further embodiment, which also implements the V.24 interface, voice transmissions are identified by predetermined signals transmitted using a V.24 handshake circuit.

BRIEF DESCRIPTION OF DRAWINGS

The present invention will be described by way of exemplary embodiments, but not limitations, illustrated in the accompanying drawings, in which like references denote similar elements, and in which.

DETAILED DESCRIPTION

In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatic or block diagram form in order not to obscure the present invention.

Figure 1:
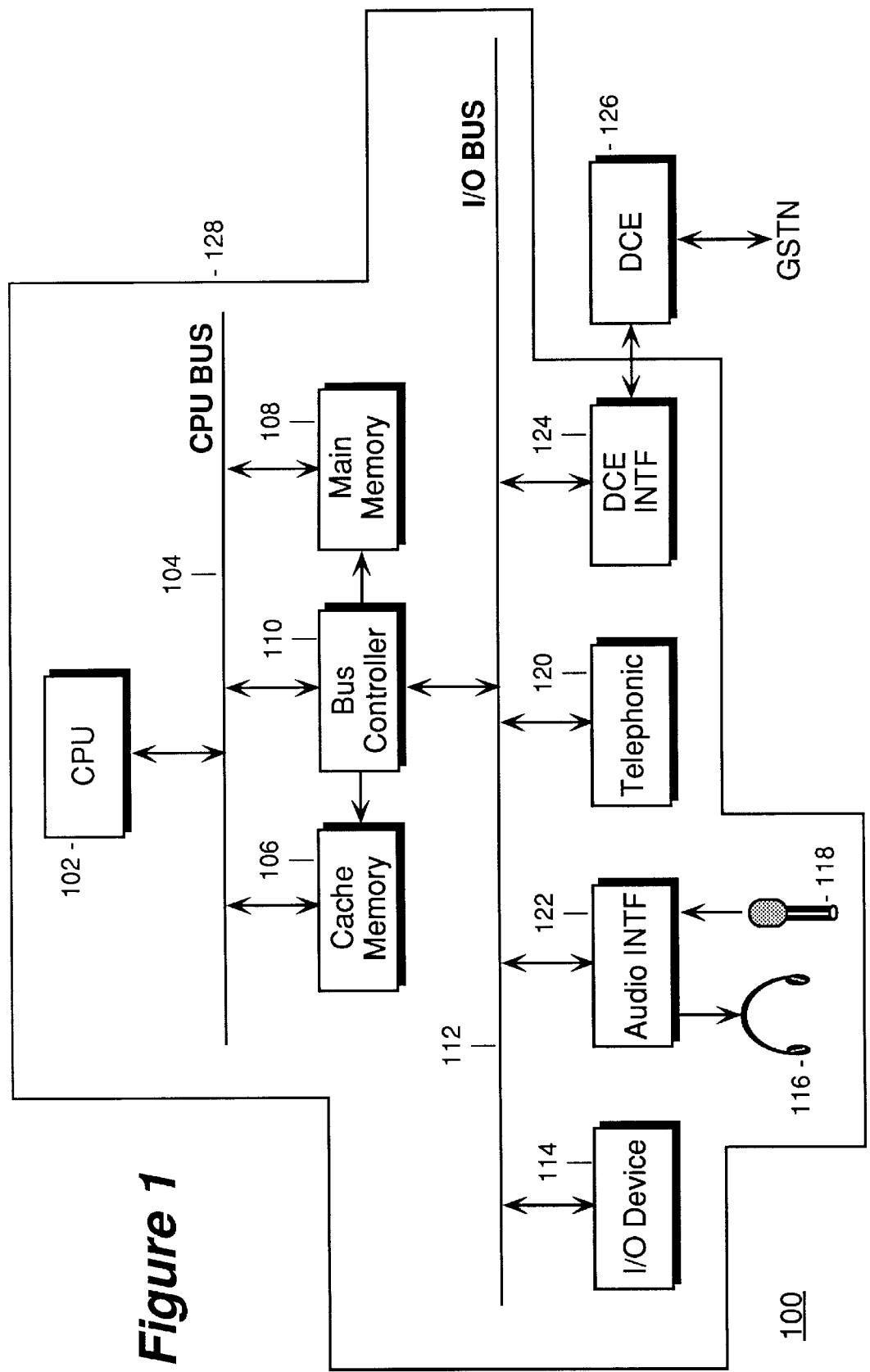
FIGS. 1 illustrates an exemplary computer based voice and data enabled system incorporating teachings of the present invention.

Referring now to FIG. 1, a block diagram illustrating an exemplary computer based voice and data enabled system incorporated with the teachings of the present invention is shown. As illustrated, the exemplary system 100 comprises a CPU 102, a CPU bus 104, cache and main memory 106 and 108, and a bus controller 110 coupled to each other as shown. Additionally, the exemplary system 100 comprises an I/O bus 112, an I/O device 114, a headphone 116, a microphone 118, an audio interface 122 having a low-bit rate vocoder (not shown), and telephony circuitry 120 coupled to each other and the earlier described elements as shown. By way of example, the low-bit rate vocoder may be a Truespeech vocoder manufactured by DSP Group of Santa Clara, Calif. Furthermore, the exemplary system 100 comprises a DCE interface 124, and a DCE 126 (having a DTE interface (not shown in FIG. 1)) coupled to the DCE interface 124 and a GSTN as shown, forming a single DTE–DCE link. Also by way of example, the DCE interface 124 may implement the DTE side of ITU-T's V.24 interface.

Elements 102–126 are used to execute traditional applications involving traditional numerical and character data, as well as modern multimedia applications involving digitized audio and video data in addition to the traditional numeric and character data. Elements 102–126 are also used to execute telephony applications involving digitized voice data. Some of these processing involve sending and receiving these various kinds of data to and from other remote systems through the DCE 126 and the GSTN. In particular, some voice and data applications, such as personal conferencing, involve sending and receiving of digitized voice as well as data to and from the other end of a telephone connection through the DCE 126 and the GSTN. In other words, both voice and data are sent and received over the single DTE–DCE link.

In one embodiment, voice and data are sent and received over the single DTE–DCE link in compressed form. In other words, elements 102–124 are also used for compressing the voice and data before they are sent over the single DTE–DCE link, and for decompressing them after receiving them in compressed form over the single DTE–DCE link.

DCE 126 "interacts" with all other elements of the exemplary system 100, such as elements 102–122, through DCE interface 124. In other words, collectively, all the other elements on the other side of the DCE interface 124 appear as a DTE 128 to the DCE 126. Both the DTE 128 as well as the DCE 126 are incorporated with the teachings of the present invention to multiplex, in either direction, voice and data over the single DTE–DCE link, to ensure certain predetermined minimum voice quality level with a predetermined maximum latency is sustained.

Except for the teachings of the present invention incorporated by both the DTE 128 and the DCE 126, which will be described in detail below, elements 102–124 are intended to represent a broad category of these elements found on many computer systems. Preferably, elements 102–124 are provided with sufficient capacity to support a voice compression/decompression rate of 9600 bps or lower. Otherwise, their functions and constitutions are well known and will not be further described.

While the present invention is being described with the exemplary system, based on the description to follow, the present invention may also be practiced on a DTE having a different architecture, and/or a DTE coupled to an external DCE combination.

Figure 2:
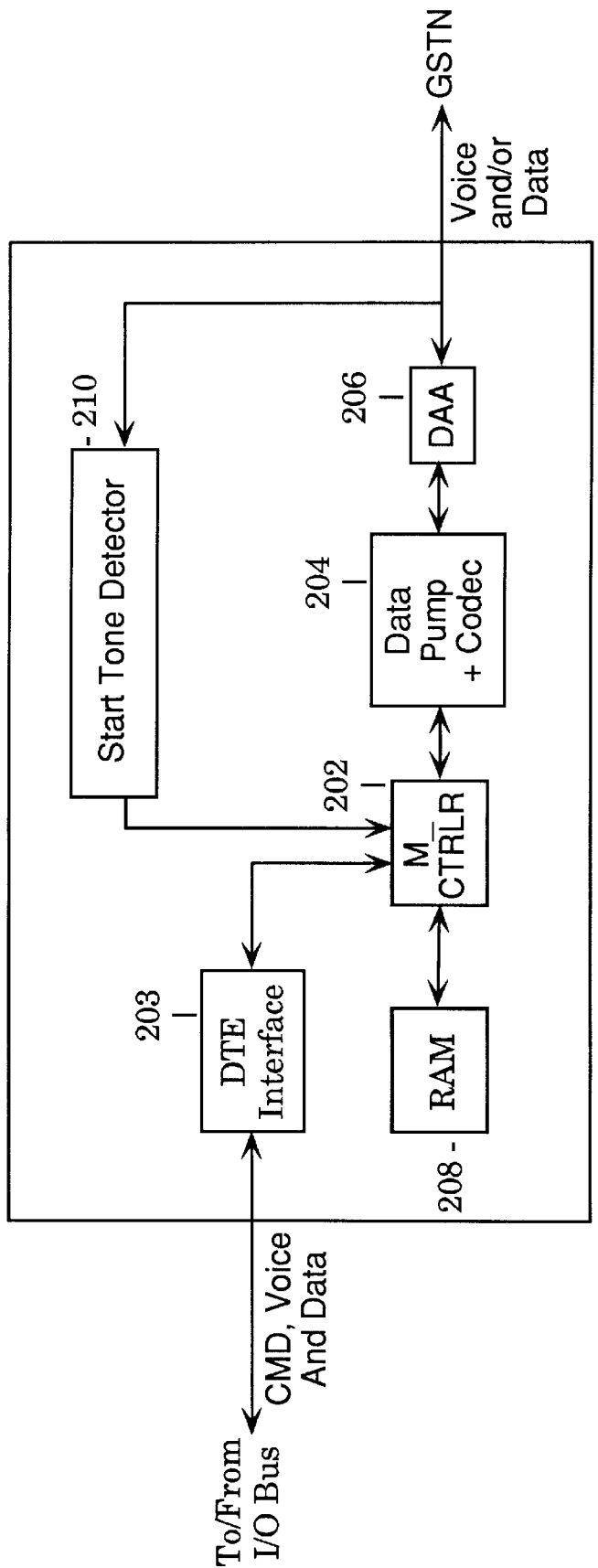
FIG. 2 illustrates one embodiment of the DCE of FIG. 1 in further detail.

Referring now to FIG. 2, a block diagram illustrating one embodiment of the DCE of FIG. 1 is shown. As illustrated, DCE 126 in accordance to the present invention comprises an enhanced micro-controller 202 incorporating teachings of the present invention. The DCE 126 further comprises a DTE interface 203, a data pump digital signal processor (including an analog to digital and digital to analog converter) 204, data equipment attachment adapter circuitry (DAA) 206, random access memory 208, and a predetermined start up signal detection circuitry 210.

The micro-controller 202, as will be described in more details below, operates the DCE 126 in at least four modes, transitioning the DCE 126 between these operating modes responsive to local events or commands, as well as remote commands as appropriate. The DTE interface 203 may implement the DCE side of ITU-T's V.24 interface.

The data pump digital signal processor 204 is intended to represent a broad category of digital signal processors known in the art. Its constitutions and functions are well known, and will not be further described. Preferably, the data pump digital signal processor 204 is a high performance digital signal processor capable of supporting a transmission rate of 14,400 bps or higher.

The DAA 206, and the start up signal detection circuitry 210 are intended to represent a broad category of these elements found in many DCEs. Their constitutions and functions are well known, and will not be further described.

Figure 3A:
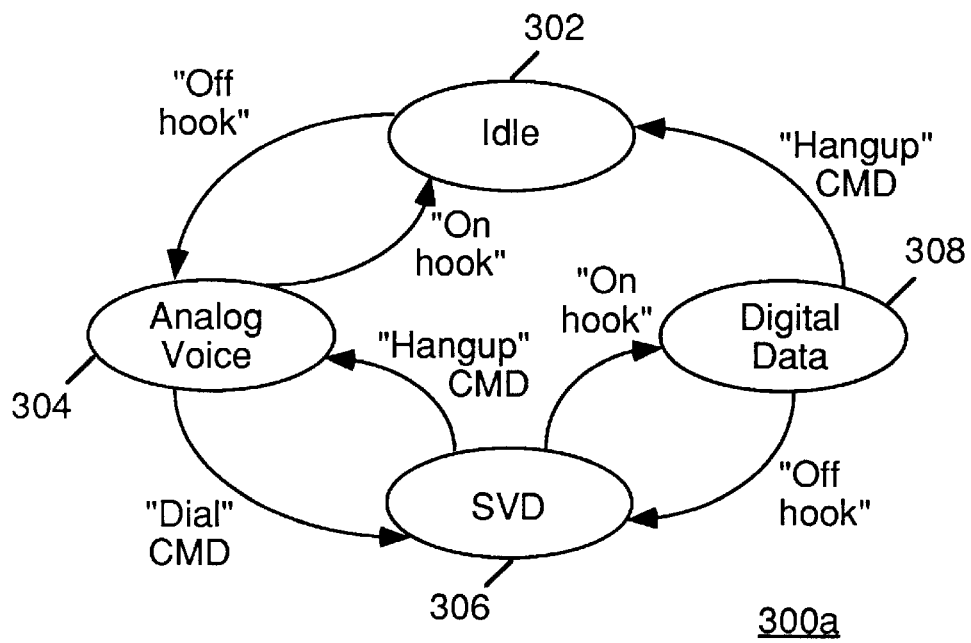
FIGS. 3a–3b illustrate one embodiment of the operating modes of the DCE of FIG. 2.
Figure 3B:
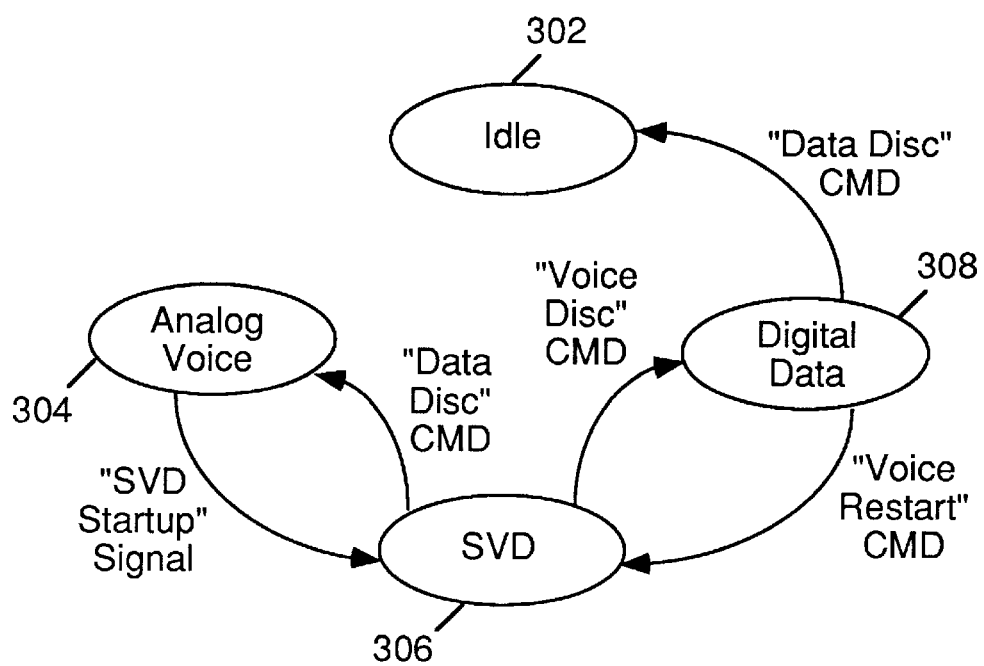

Referring now to FIGS. 3a–3b, two state diagrams illustrating the operating modes and transitional rules of the enhanced micro-controller of FIG. 2 are shown. As illustrated, the enhanced micro-controller 202, responsive to local events or commands as well as remote commands, controls the operation of the DCE 126 in one of four modes, an idle mode 302, an analog voice mode 304, a digital data mode 308, and a simultaneous voice and data (SVD) mode 306.

The operating modes and transitional rules are described in detail in the above identified copending U.S. Pat. application Ser. No. 08/265,455, which is hereby fully incorporated by reference. Additionally, the manners in which the enhanced micro-controller 202 cooperates with a communication endpoint at the other end of a single analog telephone line connection to automatically transition from the analog voice mode 304 to the SVD mode 306, and to multiplex voice and data over the analog telephone line while operating under the SVD mode 306, are described in detail in copending U.S. Pat. application Ser No. 08/265,314, filed Jun. 24, 1994, entitled Method And Apparatus For Automatically Converting From An Analog Voice Mode To A Simultaneous Voice And Data Mode Including Establishment Of Transmission Protocols For A Multi-Modal Voice And/Or Data Call Over A Single Analog-Loop Telephone Line, and Ser. No. 08/265,326, filed Jun. 24, 1994, entitled Method And Apparatus For Multiplexing Voice And Data On A Single Analog-Loop Telephone Line, both assigned to the assignee of the present invention, and are hereby fully incorporated by reference. However, the operating modes and the transitional rules will nevertheless be briefly redescribed to the extent necessary to facilitate description of the present invention for multiplexing voice and data over the single DTE–DCE link.

During system initialization, the CPU 102 and the micro-controller 202 jointly establish a DTE–DCE connection. In addition to the conventional start-up information, the CPU 102 provides the micro-controller 202 with the transmission bit rate and block size for voice. Upon initialization, the micro-controller 202 places the DCE 126 in the idle mode 304. While in the idle mode 302, the micro-controller 202 detects for remote signals indicative of a call being placed to the DTE 128 (hereinafter "ring" signals). The "ring" signals are passed onto the DTE 128.

In the embodiment where the DCE interface 124 and DTE interface 203 jointly implement ITU-T's V.24 interface, the "ring" signals are provided to the DTE 128 using "ring" result encoded messages and asserting the "Ring Indicate" handshake circuit.

From the idle mode 302, as illustrated in FIG. 3a, the micro-controller 202 places the DCE 126 in the analog voice mode 304, upon being notified by the DTE 128 of a simulated "telephone going off hook" event, and operates the DCE 126 accordingly. The DTE 128 may provide the notification on its own initiative or in response to the "ring" signals. If the DTE 128 provides the notification on its own initiative, the micro-controller 202 causes a call to be made on behalf of the DTE 128 to the communication endpoint at the other end of the telephone line.

While the DCE 126 is being operated by the micro-controller 202 in the analog voice mode 306, the DTE 128 provides only digitized voice to the DCE 126. The micro-controller 202 in turn causes the digitized voice to be converted to analog voice and then causes the analog voice to be transmitted to the communication endpoint at the other end of the telephone connection. Similarly, as described in the incorporated by reference copending U.S. patent applications, the communication endpoint at the other end of the telephone connection will also be operating in the analog voice mode 304 providing only analog voice to the DCE 126. The micro-controller 202 causes the analog voice to be digitized and then causes the digitized voice to be provided to the DTE 128 over the single DTE–DCE link.

From the analog voice mode 304, the micro-controller 202 either returns the DCE 126 to the idle mode 302, upon being notified by the DTE 128 of a simulated "telephone going from off hook to on hook" event; or places the DCE 126 in the SVD mode 306, upon receipt of a "dial" command from the DTE 128, and operates the DCE 126 accordingly. The DTE 128 provides the "on hook" notification to cause the DCE 126 to return to the idle mode 302, whenever the DTE 128 wants to terminate the telephone connection. The DTE 128 provides the "dial" command to cause the DCE 126 to enter the SVD mode 306, whenever the DTE 128 wants to start sending and/or receiving data as well as voice with the communication endpoint at the other end of the telephone connection.

Additionally, during operation, as illustrated by FIG. 3b, from the analog voice mode 304, the micro-controller 202 also places the DCE 126 in the SVD mode 306, upon detection of receiving a predetermined "start up" signal pattern from the other end of the telephone line connection, and operates the DCE 126 accordingly. The predetermined "start up" signal pattern unambiguously identifies to the DCE 126 the "start up" signal originator's desire to transition the call from the analog voice mode 304 to the SVD mode 306.

While the DCE 126 is being operated by the micro-controller 202 in the SVD mode 306, the CPU 102 provides the micro-controller 202 with digitized voice as well as data. The CPU 102 multiplexes the voice and data over the single DTE–DCE link in accordance to the present invention. Similarly, as described in the incorporated by reference copending U.S. patent applications, the communication endpoint at the other end of the telephone connection will also be operating in the SVD mode 306 providing digitized voice as well as data to the DCE 126. The micro-controller 202 causes the digitized voice as well as data to be provided to the DTE 128. Likewise, the micro-controller 202 multiplexes the voice and data over the single DTE–DCE link in accordance to the present invention.

The manner in which the DTE 128 provides the "dial" command to the DCE 126 is protocol dependent. For example, under Telecommunication Industry Association (TIA) and Electronic Industry Association (EIA) 602 protocol, the "dial" command is provided by the "ATD" modem command.

Preferably, voice are transmitted over the single DTE–DCE link without flow control and buffering at predetermined desired fix time intervals, whereas data are transmitted over the DTE–DCE link with flow control and buffering in between the nominally fixed time intervals.

Voice are preferably transmitted without flow control and buffering because voice are "real time data". Buffering would give a user perception of end-to-end delay or poor quality. The time duration between two voice transmissions are predetermined based on the bit rate of the voice compression, and its block size. For example, for True Speech 1 with a bit rate compression of 8533.33 bps, and a block size of 256 bits, the time duration between audio transmissions is approximately every 30 millisec (256 bits/8533.33 bps).

Figure 4:
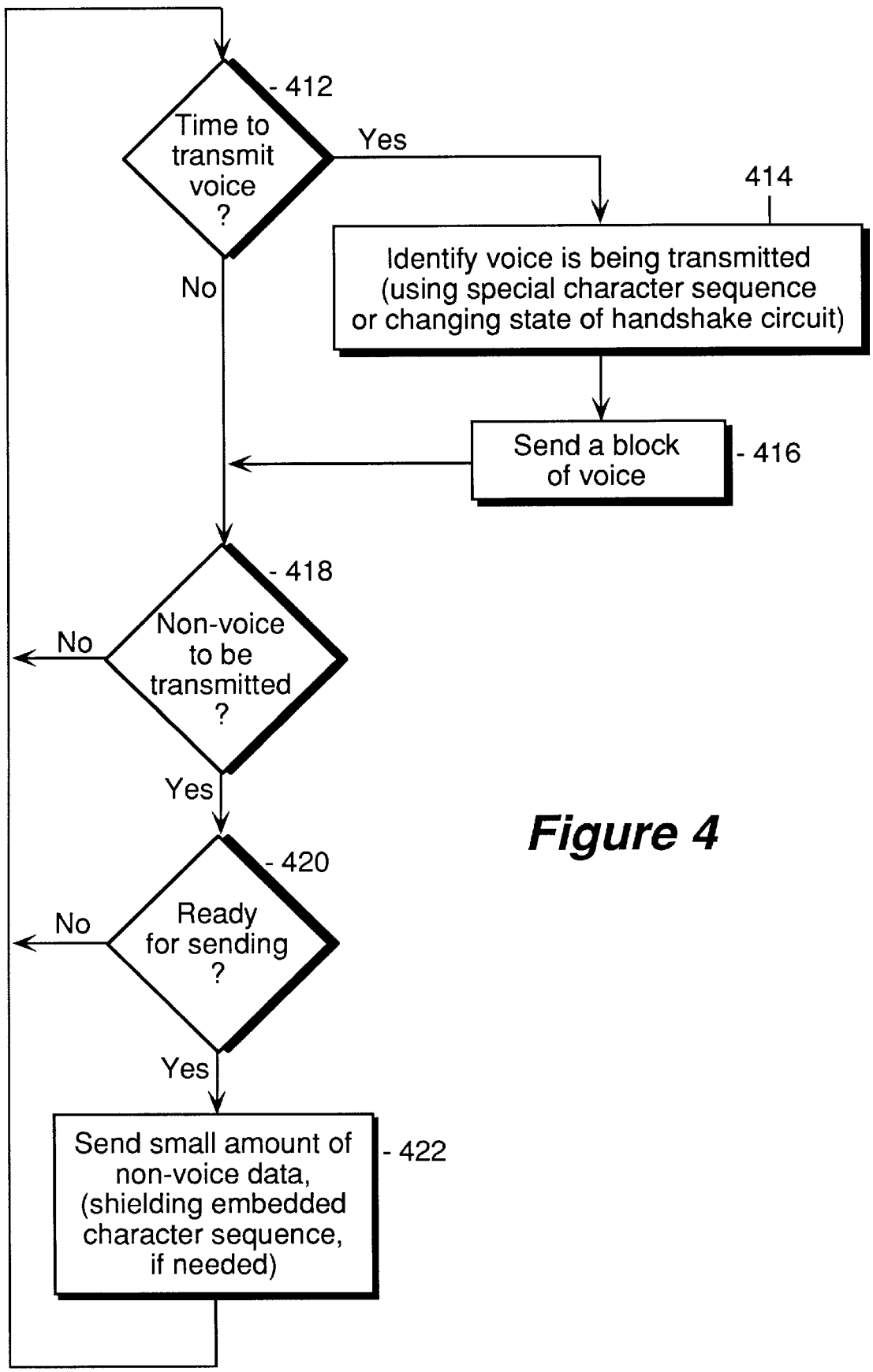
FIG. 4 illustrates the method steps of the present invention for multiplexing voice and data over the DTE–DCE connection.

Referring now to FIG. 4, a block diagram illustrating the method steps of the present invention employed by the CPU and the micro-controller for multiplexing voice and data over the single DTE–DCE link is shown. As illustrated, the CPU/micro-controller 102/202 continuously monitors and determines whether it is time to transmit voice, block 412. If it's time for voice transmission, the CPU/micro-controller 102/202 identifies voice is going to be transmitted, block 414, and then sends a block of voice over the single DTE–DCE link, block 416. In other words, as described earlier, voice is transmitted without flow control and buffering.

In one embodiment, transmission of voice is identified by the use of special characters, for examples, one or more escape characters. In an alternate embodiment, which implements the ITU-T V.24 interface, transmission of voice is identified by changing the state of a predetermined handshake circuit, for example, the Data Set Ready circuit (DSR).

In yet a further alternate embodiment which also implements ITU-T's V.24 interface, block 414 may be skipped and transmission of voice may be identified by transmitting them using the secondary circuit.

If it is not time to transmit voice, the CPU/micro-controller 102/202 further determines if there are non-voice data ready for transmission, block 418. If there are new non-voice data ready for transmission, the CPU/micro-controller 102/202 further determines if the DCE/DTE 126/128 is ready to accept the non-voice data, block 420. If the DCE/DTE 126/128 is ready to accept the non-voice data, the CPU/micro-controller 102/202 transmits a small amount of non-voice data (typically 1–16 bytes), block 422. In other words, as described earlier, voice is transmitted with flow control and buffering.

In one embodiment which implements the ITU-T V.24 interface, readiness to accept non-voice data by the DCE/DTE 126/128 is determined by the assertion/deassertion of circuit 106/133.

Thus, a method and apparatus for multiplexing voice and data over a single DTE–DCE link has been described. While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

I claim:

1. An improved micro-controller of a data circuit terminating equipment (DCE), wherein the improvements comprise:

operating logic for transmitting during operation voice to a directly coupled host data terminal equipment (DTE) over a DTE–DCE link physically and directly coupling the host DTE and the DCE, at nominally fixed time intervals, without buffering by the DCE, and for transmitting during operation either data or information to be exchanged with the host DTE to the host DTE over the DTE–DCE link, with buffering by the DCE, when the operating logic is not transmitting voice, while the DCE is being operated in a simultaneous voice and data (SVD) mode of operation.

2. The improved micro-controller of claim 1, wherein the operating logic distinguishes voice from data for the host DTE by transmitting predetermined special characters to the host DTE over the DTE–DCE link.

3. The improved micro-controller of claim 1, wherein the operating logic distinguishes voice from data for the host DTE by changing a handshake circuit of a DTE–DCE interface implementing the DTE–DCE link to a predetermined state, the handshake circuit having more than one circuit state.

4. An improved data circuit terminating equipment (DCE), wherein the improvements comprise:

(a) a micro-controller having operating logic for operating the DCE in at least an idle mode, an analog voice mode or a simultaneous voice and data (SVD) mode, and control logic for switching the DCE's operating mode from the idle mode to the analog voice mode, and then to the SVD mode, wherein the operating logic, while operating the DCE in the SVD mode, transmits voice to a directly coupled host data terminal equipment (DTE) over a DTE–DCE link physically and directly linking the DCE and the host DTE, at nominally fixed time intervals, without buffering by the DCE, and transmits either data or information to be exchanged with the host DTE to the host DTE over the DTE–DCE link not with buffering by the DCE, when the operating logic is not transmitting voice.

5. The improved DCE of claim 4, wherein the operating logic distinguishes voice from data for the host DTE by transmitting predetermined special characters to the host DTE over the DTE–DCE link.

6. The improved DCE of claim 4, wherein the operating logic distinguishes voice from data for the host DTE by changing a handshake circuit of a DTE–DCE interface implementing the DTE–DCE link to a predetermined state, the handshake circuit having more than one circuit state.

7. A method for multiplexing voice and data over a link physically and directly linking a host data terminal equipment (DTE) and a data circuit terminating equipment (DCE) by a micro-controller of the DCE while operating the DCE in a simultaneous voice and data (SVD) mode of operation, the method comprising the steps of:

(a) transmitting voice to the host DTE over the DTE–DCE link at nominally fixed time intervals without buffering by the DCE; and (b) transmitting either data or information to be exchanged with the host DTE to the host DTE over the DTE–DCE link with buffering by the DCE, when voice is not being transmitted.

8. The improved method of claim 7, wherein voice are distinguished from data for the host DTE by transmitting predetermined special characters when performing step (a).

9. An improved host data terminal equipment (DTE), wherein the improvements comprise:

(a) a CPU executing operating logic for transmitting voice and data to a DCE directly coupled to the host DTE over a DTE–DCE link physically and directly linking the host DTE and DCE, wherein the operating logic, while the DCE is being operating in a simultaneously voice and data (SVD) mode, transmits voice over the DTE–DCE link at nominally fixed time intervals, without buffering by the DCE, and transmits either data or information to be exchanged with the DCE to the DCE over the DTE–DCE link with buffering by the DCE, when the oprating logic is not transmitting voice.

10. The improved host DTE of claim 9, wherein the operating logic distinguishes voice from data for the DCE by transmitting predetermined special characters to the DCE over the DTE–DCE link.

11. The improved host DTE of claim 9, wherein the operating logic distinguishes voice from data for the DCE by changing a handshake circuit of a DTE–DCE interface implementing the DTE–DCE link to a predetermined state, the handshake circuit having more than one circuit state.

12. A method for multiplexing voice and data over a link physically and directly linking a host data terminal equipment (DTE) and a data circuit terminating equipment (DCE) by a central processing unit (CPU) of the host DTE while the DCE is being operated in a simultaneous voice and data (SVD) mode of operation, the method comprising the steps of:

(a) transmitting voice to the DCE over the DTE–DCE link at nominally fixed time intervals without buffering by the DCE; and (b) transmitting either data or information to be exchanged with the DCE to the DCE over the DTE–DCE link with buffering by the DCE, when voice is not being transmitted.

13. The improved method of claim 12, wherein voice are distinguished from data for the host DTE by changing a handshake circuit of a DTE–DCE interface implementing the DTE–DCE link, to a predetermined state, of the handshake circuit having more than one circuit state.

14. The improved method of claim 13, wherein voice are distinguished from data for the DCE by transmitting predetermined special characters when performing step (a).

15. The improved method of claim 12, wherein voice are distinguished from data for the DCE by changing a handshake circuit of a DTE–DCE interface implementing the DTE–DCE link to a predetermined state, the handshake circuit having more than one circuit state.

* * * * *